Nov. 30, 1937. A. E. WOODRUFF ET AL 2,100,500
TELEPHONE UNIT
Filed Aug. 2, 1934   2 Sheets-Sheet 1
FIG. 1
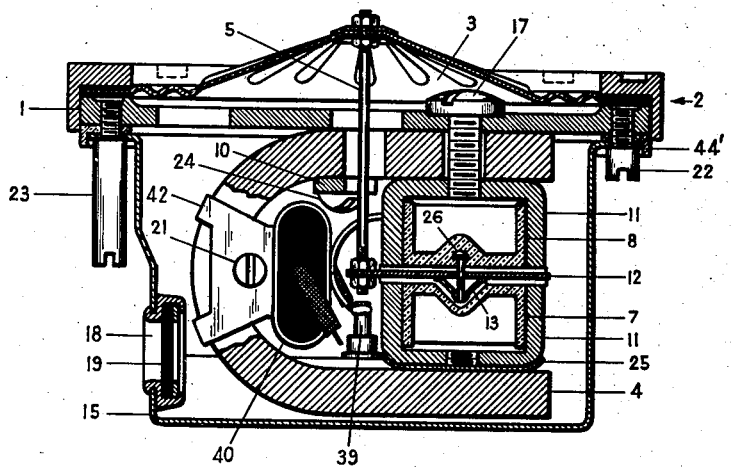
FIG. 2
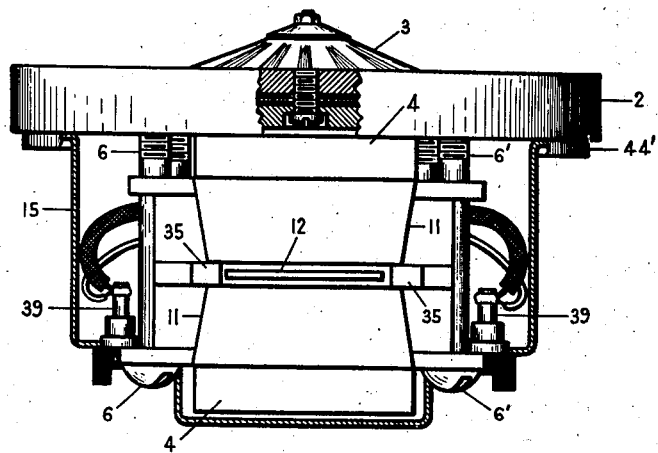
FIG. 3
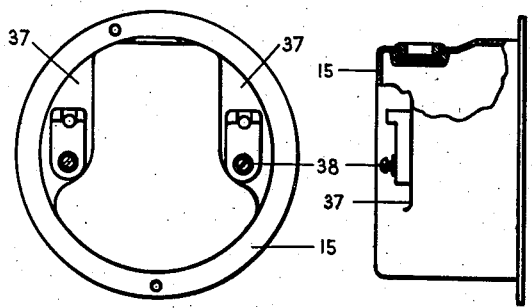
FIG. 4
FIG. 5
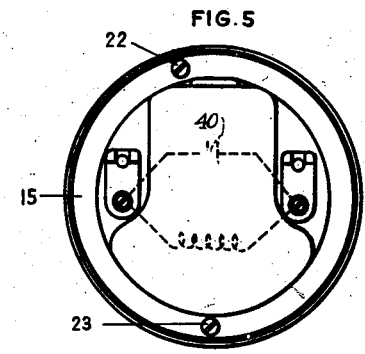
INVENTOR
HANS SENGEBUSCH
ALBERT E. WOODRUFF
ATTY.

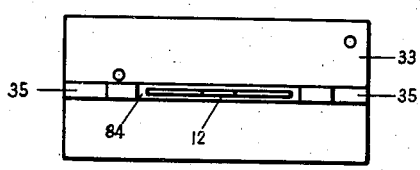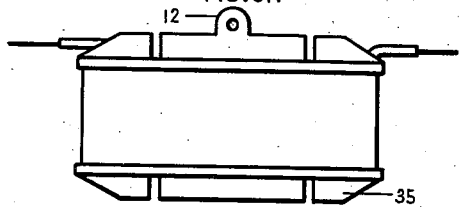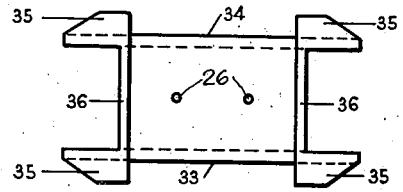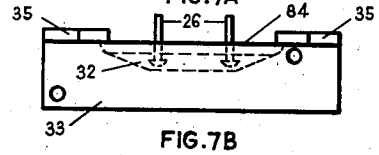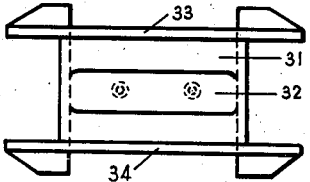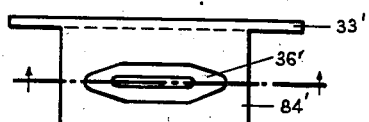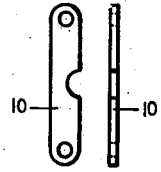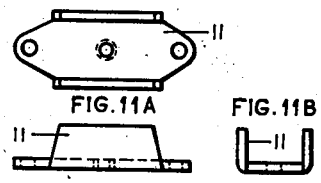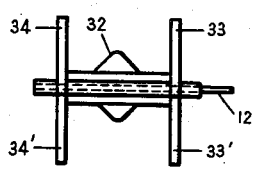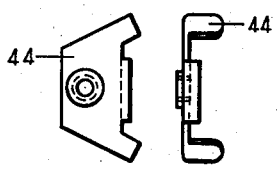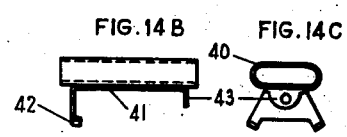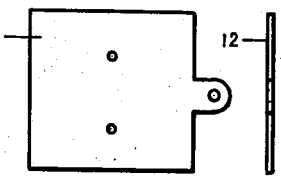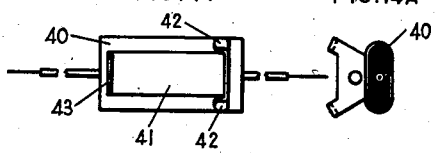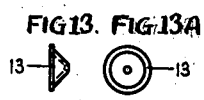

Patented Nov. 30, 1937

2,100,500

UNITED STATES PATENT OFFICE 2,100,500

TELEPHONE UNIT

Albert E. Woodruff, Oak Park, and Hans Sengebusch, Villa Park, Ill., assignors to Associated Electric Laboratories, Inc., Chicago, Ill., a corporation of Delaware Application August 2, 1934, Serial No. 738,030

3 Claims. (Cl. 179—119)

The present invention relates in general to telephone units, but is particularly concerned with the design and construction of a compact and efficient magnetic unit which may be employed either as a transmitter or as a receiver.

One feature of the invention has to do with the employment of a coil spool and armature assembly of very simple construction.

Another feature has to do with the arrangement of a condenser located in a space within the unit otherwise wasted.

A still further feature is concerned with the breather arrangement employed to permit equalization of the air pressure on both sides of the diaphragm.

There are various other features not specifically mentioned, but which will become apparent from the following detailed description and claims.

The invention is disclosed in two sheets of drawings wherein—Fig. 1 is a view of the magnetic unit in elevation with certain parts thereof in section; Fig. 2 is a view of the unit in elevation as seen from the direction indicated by arrow 2, Fig. 1, but with only a portion of the cover broken away; Fig. 3 is a bottom view of the unit cover; Fig. 4 is a side view of Fig. 2; Fig. 5 is a bottom view of the unit and cover with the wiring of the unit indicated diagrammatically; while Figs. 6 to 15 illustrate various details of the assembly.

The armature and coil assembly employed will first be described. The spool of this assembly comprises two complementary parts molded from insulating material. The one part, shown in Figs. 7, 7A and 7B, has a flat surface 31 provided with spool heads 33 and 34 and with a centrally raised portion 32 having armature supporting pins 26 inserted therein. These pins protrude beyond the top of a shallow armature channel 84 formed by spacing members 35 and small ridges 36 of material connecting them and running at right angles to the spool head members.

An appropriately perforated armature 12, shown in Figs. 12 and 12A, is threaded on the pins 26 and centrally spaced between the bottom of the channel 84, the top of spacing members 35, and between the ridges 36. The armature 12 is rigidly secured to the pins 26 by placing small cone-like washers 13 Figs. 13 and 13A on the ends of these pins and soldering these washers to the armature and pins respectively as seen in Figure 1.

The other part of the spool, shown in Figs. 8 and 8A, has a flat surface, a centrally raised portion and spool head members 33' and 34' like the corresponding portions 33—34 of the first described spool part. This other part of the spool, however, differs from the one having the armature, since it does not have spacing members such as 35 or ridge members such as 36. The surface 84', corresponding to the surface of the channel 84 of the first part, is a plane surface except for a centrally located depression 36' therein which provides space for the ends of pins 26 and washers 13 when the two spool parts are assembled.

It will be seen from Fig. 6 that when the two spool parts are assembled the last described part bridges the armature channel 84. The winding space provided by the assembled spool parts is clearly shown in Fig. 9. In Fig. 6A the spool is illustrated with the winding thereon, and which serves to hold the two halves of the spool in fixed relation to each other.

Various views of the pole pieces employed are shown in Figs. 11, 11A and 11B. The spacing members 35 of the coil and armature assembly are inserted between two of these pole pieces 11 in the manner clearly illustrated in Figs. 1 and 2. These pole pieces, with the armature and coil assembly therebetween, are positioned in the space between the poles of the permanent magnet 4. To take care of variations in manufacture one or more shims 25 may be employed to obtain a snug fit of this assembly between the permanent magnet poles.

The permanent magnet 4, a main supporting member 1, and the coil and armature assembly are now securely clamped together by two screws 6 and 6' which pass through holes in the pole pieces 11 and which are threaded into the support 1 at opposite sides of the permanent magnets. The permanent magnet 4 and the described assembly is further secured to support 1, by a screw 17 passing through support 1 a pole of the permanent magnet, and threaded into one of the pole pieces 11, as clearly illustrated in Fig. 1; and by a clamping member 10 which holds the magnet to support 1 by means of screws 24 passing through member 10 and threaded into support 1.

The diaphragm 3 is clamped between the waterproof washers arranged between the upper side of support 1 and a clamping ring 2, by a plurality of screws passing through the support 1 and threaded into ring 2, as illustrated in Fig. 2. The shaft 5 links the diaphragm to the armature 12 and is adjusted to normally hold the armature centrally between the associated pole pieces 11.

It will be noted that although a cone-type of diaphragm is employed, the base of the cone is arranged adjacent the support 1. With the cone arranged in this manner no increase in the height of the casing for the unit is required as would be the case were the apex of the cone pointed in the opposite direction.

The condenser assembly is shown in detail in Figs. 14, 14A, 14B, and 14C. It will be seen from these figures that the condenser proper is enclosed in a metal tube 40 to which is soldered or otherwise secured a bracket 41. The large end of this bracket has two portions 42 adapted to hook over the outer edges of the closed end of the permanent magnet 4. The small end 43 of the bracket serves as a guide for a clamping screw 21 which passes through the large and small ends of the bracket and is threaded into a cooperative clamping member 44 seen in Figs. 15 and 15A. This latter member is quite similar to the large end of bracket 41 and engages the opposite side of the permanent magnet in a similar manner. As seen in Fig. 5 the condenser 40 is connected in multiple with the coil of the unit. Its purpose is to increase the response of the unit to the frequencies of voice currents in the higher wave bands.

The portion of the unit below the support 1 is protected against the entry of water therein by a cup-like cover 15. This cover has in one of its sidewalls a thimble 18 within which is secured a petroleum impregnated felt disk 19 serving as a breather. This disk 19 enables air pressure to reach the underside of the diaphragm 3 and equalize with that on the upper side thereof.

In depressed portions 37, Figs. 3 and 4, of the base of the cover 15 screw terminal assemblies 38 are provided. Extensions 39, Fig. 2, of these terminals protrude into the cup or cover 15 and the conductors extending from the coil and condenser are soldered to them. The circuit connections are diagrammatically shown in Fig. 5.

The cover 15 is secured to the under side of support 1 by screws 22 and 23 with a rubber gasket 44' between 1 and 15 to make the connection water tight. The heads of screws 22 and 23 are of different length for the reason that they are employed to insure the proper placement of the unit with respect to casings in which the units are employed.

Having described the invention, what is considered to be new and is desired to be protected by Letters Patent will be set forth in the following claims.

What is claimed is:

1. In a telephonic apparatus, a spool and armature assembly comprising two complementary parts of insulating material, one part having a depressed transverse channel portion with armature support pins extending therefrom, an armature, of a thickness fractional of the depth of the depressed channel portion, perforated to receive said pins, located centrally of and lying wholly within the channel portion and rigidly secured to said pins; the other part having a continuous plane surface throughout its length adjacent to and bridging said channel portion of the other part except for a longitudinal depression in said plane surface for accommodating the ends of said pins.

2. In an article of manufacture, an armature, a fixed support for said armature comprising one of a pair of complementary sections of an electromagnet spool of insulating material, a pair of resilient members embedded in said section and protruding therefrom, perforations in said armature receiving said members, and hollow cone-shaped washers placed over the ends of said members and over the perforations in said armature with their bases secured to the armature and their apexes secured to the ends of the members for rigidly securing said washers, members, and said armature in fixed relation to each other.

3. In a telephone unit, a spool of insulating material for a coil comprising a pair of complementary parts, each part consisting of a channel shaped section in which the coil winding is wound to hold the two parts together, said parts having opposite flat sides abutting and one of the parts being cut away to form an opening, an armature in said opening, and means in said opening for supporting said armature therein, said means comprising a centrally raised portion on the channel side of each of said parts for accommodating the supporting means.

ALBERT E. WOODRUFF.
HANS SENGEBUSCH.